United States Patent
Doi

(10) Patent No.: US 10,833,537 B2
(45) Date of Patent: Nov. 10, 2020

(54) COIL UNIT

(71) Applicant: Toyota Jidosha Kabushiki Kaisha, Toyota (JP)

(72) Inventor: Taiga Doi, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/290,205

(22) Filed: Mar. 1, 2019

(65) Prior Publication Data

US 2019/0273397 A1 Sep. 5, 2019

(30) Foreign Application Priority Data

Mar. 2, 2018 (JP) ................. 2018-037507

(51) Int. Cl.
*H01F 27/02* (2006.01)
*H02J 7/02* (2016.01)
*H02J 50/12* (2016.01)
*B60L 53/12* (2019.01)
*H02J 7/00* (2006.01)

(52) U.S. Cl.
CPC .............. *H02J 50/12* (2016.02); *B60L 53/12* (2019.02); *H01F 27/022* (2013.01); *H02J 7/0042* (2013.01); *H02J 7/025* (2013.01)

(58) Field of Classification Search
CPC ........ B60L 53/12; H01F 27/02; H01F 27/022; H02J 5/00; H02J 5/005; H02J 7/0042; H02J 7/025; H02J 17/00; H02J 50/005; H02J 50/10; H02J 50/12
USPC ...................................................... 307/104
See application file for complete search history.

(56) References Cited

U.S. PATENT DOCUMENTS

| | | | | |
|---|---|---|---|---|
| 9,245,682 | B2* | 1/2016 | Miura | ............. H01F 27/02 |
| 2013/0127409 | A1 | 5/2013 | Ichikawa | |
| 2013/0193749 | A1 | 8/2013 | Nakamura et al. | |
| 2014/0055089 | A1* | 2/2014 | Ichikawa | ............. H01F 38/14 |
| | | | | 320/108 |
| 2015/0008877 | A1 | 1/2015 | Ichikawa et al. | |
| 2016/0197520 | A1* | 7/2016 | Akuzawa | ............. H02J 5/005 |
| | | | | 307/104 |
| 2016/0250935 | A1 | 9/2016 | Yuasa | |
| 2018/0198318 | A1* | 7/2018 | Jain | ............. H01F 27/40 |
| 2019/0109373 | A1* | 4/2019 | Ahn | ............. G06K 19/0726 |

FOREIGN PATENT DOCUMENTS

| | | |
|---|---|---|
| CN | 104505243 A | 4/2015 |
| CN | 105932782 A | 9/2016 |
| JP | 2013110822 A | 6/2013 |
| JP | 2013126327 A | 6/2013 |
| JP | 2013146148 A | 7/2013 |
| JP | 2013146154 A | 7/2013 |
| JP | 2013154815 A | 8/2013 |
| JP | 2017126596 A | 7/2017 |

* cited by examiner

Primary Examiner — Levi Gannon
(74) Attorney, Agent, or Firm — Dinsmore & Shohl LLP

(57) ABSTRACT

A coil unit includes a coil and an accommodation case accommodating the coil. The coil is formed of a coil wire wound around a winding axis. A hollow portion is formed in a position in which the winding axis passes. The coil includes an outer peripheral portion located in an outer peripheral edge of the coil, and an inner peripheral portion located along an inner peripheral edge of the coil. A voltage on the inner peripheral portion is higher than a voltage on the outer peripheral portion.

4 Claims, 4 Drawing Sheets

COIL UNIT

CROSS REFERENCE TO RELATED APPLICATIONS

This nonprovisional application claims priority to Japanese Patent Application 2018-037507 filed on Mar. 2, 2018 with the Japan Patent Office, the entire contents of which are hereby incorporated by reference.

BACKGROUND

Field

The present disclosure relates to a coil unit.

Description of the Background Art

There have been proposed a variety of systems for wirelessly transmitting electric power from a power-transmitting coil unit to a power-receiving coil unit (Japanese Patent Laying-Open Nos. 2013-154815, 2013-146154, 2013-146148, 2013-110822, 2013-126327, and 2017-126596).

For example, a system disclosed in Japanese Patent Laying-Open No. 2017-126596 includes a power-transmitting coil unit and a power-receiving coil unit.

The power-transmitting coil unit includes a power-transmitting coil and a case. The power-transmitting coil is formed to surround a winding axis extending in the up-and-down direction. In the power-transmitting coil, a hollow portion is formed in a position in which the winding axis passes.

The case includes a base plate and a resin lid. The base plate is formed from aluminum or the like.

SUMMARY

In the above-referenced system during power transmission, high-voltage AC current flows through the power-transmitting coil, and high-voltage AC current flows also through a power-receiving coil in the power-receiving coil unit.

In the power-transmitting coil unit, the base plate is formed from aluminum or the like, and the power-transmitting coil and the base plate have to be electrically insulated from each other. The needs therefore arise to have a sufficient creepage distance between the power-transmitting coil and the base plate, and/or to place a thick electrically-insulating member between the power-transmitting coil and the base plate. A resultant problem is that the size of the case is likely to be larger.

Japanese Patent Laying-Open No. 2017-126596 does not disclose the configuration of the power-receiving coil unit. It is considered that a case of the power-receiving coil unit may be a resin case in order to prevent increase of the size of the case due to the need to have electrical insulation between the power-receiving coil and the case. The resin case is fastened to the bottom surface of a vehicle for example with bolts or the like. Specifically, it is considered that a plurality of bolts are arranged in the outer peripheral edge of the resin case to fasten the resin case to the vehicle's bottom surface. As a material for the bolts fastening the power-receiving coil unit, a metal material such as iron should be used in order to reduce or eliminate damage resultant from external force and/or vibration.

During power reception, high-voltage AC current flows also through the power-receiving coil, and therefore, the need for electrical insulation between the bolts and the power-receiving coil arises. It is thus considered that a long creepage distance between the bolts and the power-receiving coil and/or a thick electrically-insulating member between the bolts and the power-receiving coil is necessary. A resultant adverse effect is an increase of the physical size of the power-receiving coil unit, even when the resin case is used. Further, a metal member such as a metal case may be accommodated in the case of the power-receiving coil unit. In such a situation, there arises the need for a sufficient insulation distance between the metal member and the power-receiving coil, resulting in an increase of the physical size of the coil unit.

The present disclosure is given in view of the problem as described above. An object of the present disclosure is to provide a coil unit kept from increasing in physical size.

A coil unit includes: a coil formed of a coil wire wound around a winding axis, a hollow portion being formed in a position in which the winding axis passes; an accommodation case accommodating the coil; and a metal member. The coil includes: an outer peripheral portion located in an outer peripheral edge of the coil; and an inner peripheral portion located along an inner peripheral edge of the coil. A voltage on the inner peripheral portion is higher than a voltage on the outer peripheral portion.

In the above-indicated coil unit, the voltage on the outer peripheral portion is lower than the voltage on the inner peripheral portion, and therefore, the insulation distance between the outer peripheral portion of the coil and the metal member disposed in the coil unit can be reduced.

The coil unit includes: a first power line connected to a power storage device; a second power line connected to the power storage device; a first capacitor and a second capacitor connected in series to each other between the first power line and the second power line; and a rectifier connected to the first power line and the second power line. The rectifier includes: a first element and a second element connected in series to each other between the first power line and the second power line; and a third element and a fourth element connected in series to each other between the first power line and the second power line. The outer peripheral portion is connected between the first capacitor and the second capacitor, and the inner peripheral portion is connected between the first element and the second element.

In the above-indicated coil unit, the voltage on the outer peripheral portion of the coil is lower than the voltage on the inner peripheral portion of the coil while current flows through the coil. As a result, the insulation distance between the outer peripheral portion of the coil and the metal member disposed in the coil unit can be reduced.

The metal member is a fastening member for fastening the accommodation case to a mount surface, and the fastening member is disposed outside the outer peripheral portion of the coil.

In the above-indicated coil unit, the distance between the fastening member which is a metal member and the outer peripheral portion of the coil can be reduced, and thus the physical size of the coil unit can be reduced.

The accommodation case includes a first cover member and a second cover member, and the metal member is a cover fastening member for fastening the first cover member and the second cover member to each other.

In the above-indicated coil unit, the distance between the cover fastening member and the outer peripheral portion of the coil can be reduced, and accordingly the coil unit can be kept from increasing in physical size.

The coil unit further includes a device connected to the coil. The metal member is a metal case accommodating the device and accommodated in the accommodation case.

In the above-indicated coil unit, the distance between the metal case and the outer peripheral portion of the coil can be reduced, and accordingly the coil unit can be kept from increasing in physical size.

The foregoing and other objects, features, aspects and advantages of the present disclosure will become more apparent from the following detailed description of the present disclosure when taken in conjunction with the accompanying drawings.

DESCRIPTION OF THE EMBODIMENTS

Figure 1:
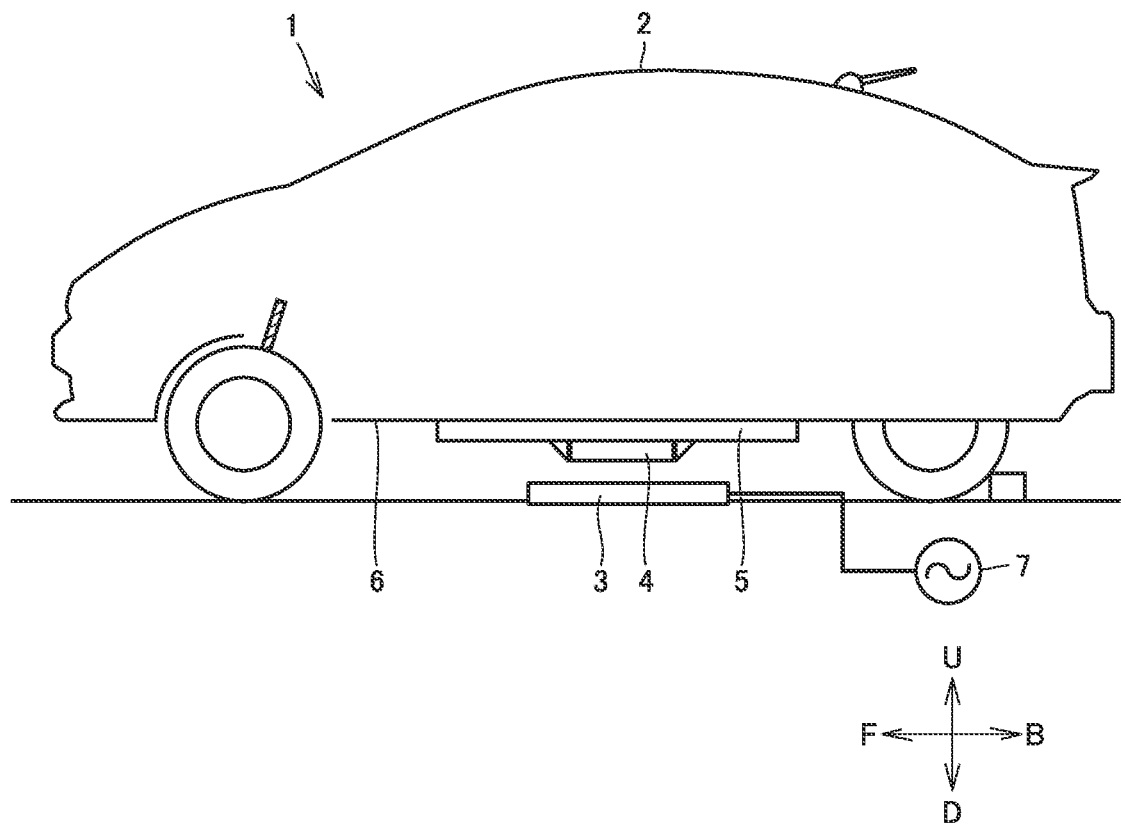
FIG. 1 is a schematic diagram schematically showing a wireless charging system 1 according to the present embodiment.

With reference to FIGS. 1 to 5, a coil unit according to the present embodiment is described. As to the components shown in FIGS. 1 to 5, components that are identical or substantially identical to each other are denoted by the same reference characters, and a description thereof is not repeated.

FIG. 1 is a schematic diagram schematically showing a wireless charging system 1 according to the present embodiment. Wireless charging system 1 includes a vehicle 2 and a power-transmitting coil unit 3. Coil unit 3 is connected to a power supply 7. In the example shown in FIG. 1, coil unit 3 is installed on the ground.

Vehicle 2 includes a power-receiving coil unit 4 and a power storage device 5. Power storage device 5 is mounted on the lower surface of a floor panel 6, and coil unit 4 is mounted on the lower surface of power storage device 5. In other words, the lower surface of power storage device 5 is a mount surface on which coil unit 4 is mounted.

Figure 2:
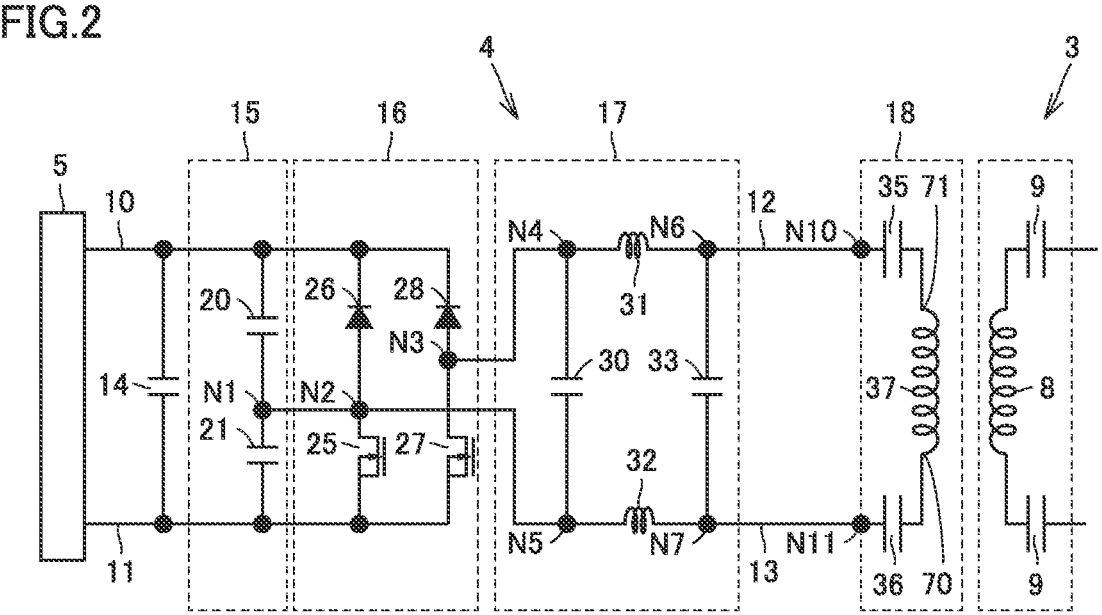
FIG. 2 is a circuit diagram schematically showing a circuit configuration of a coil unit 4 and a circuit configuration of a part of a coil unit 3.

FIG. 2 is a circuit diagram schematically showing a circuit configuration of coil unit 4 and a circuit configuration of a part of coil unit 3. Coil unit 3 includes a power-transmitting coil 8 and a capacitor 9. Coil unit 4 includes power lines 10, 11, 12, 13, a smoothing capacitor 14, a variation absorber 15, a rectifier 16, a filter 17, and a resonance circuit 18. Smoothing capacitor 14, variation absorber 15, rectifier 16, and filter 17 are arranged in order in the direction from power storage device 5 toward resonance circuit 18.

Power lines 10, 11 are connected to power storage device 5. Smoothing capacitor 14 is connected between power line 10 and power line 11.

Variation absorber 15 includes a capacitor 20 and a capacitor 21. Capacitor 20 and capacitor 21 are connected in series to each other and are connected between power line 10 and power line 11.

Rectifier 16 includes a switching element 25, a diode 26, a switching element 27, and a diode 28.

Switching element 25 is connected between power line 11 and the anode of diode 26. The cathode of diode 26 is connected to power line 10. Switching element 27 is connected between power line 11 and the anode of diode 28. The cathode of diode 28 is connected to power line 10.

Power line 12 is connected to a node N3 and resonance circuit 18. Node N3 is disposed on a line connecting diode 28 and switching element 27 to each other.

Power line 13 is connected to a node N1, a node N2, and resonance circuit 18. Node N1 is disposed on a line connecting capacitor 20 and capacitor 21 to each other. Node N2 is disposed on a line connecting switching element 25 and diode 26 to each other.

Filter 17 includes capacitors 30, 33 and inductors 31, 32. Capacitor 30 is connected between a node N4 on power line 12 and a node N5 on power line 13. Capacitor 33 is connected between a node N6 on power line 12 and a node N7 on power line 13. Inductor 31 is connected between node N4 and node N6 on power line 12. Inductor 32 is connected between node N5 and node N7 on power line 13.

Resonance circuit 18 is connected to a node N10 on power line 12 and to a node N11 on power line 13. Resonance circuit 18 includes capacitors 35, 36, and a power-receiving coil 37.

Capacitor 35 is connected between node N10 on power line 12 and one end of power-receiving coil 37. Capacitor 36 is connected between node N11 on power line 13 and the other end of power-receiving coil 37.

Figure 3:
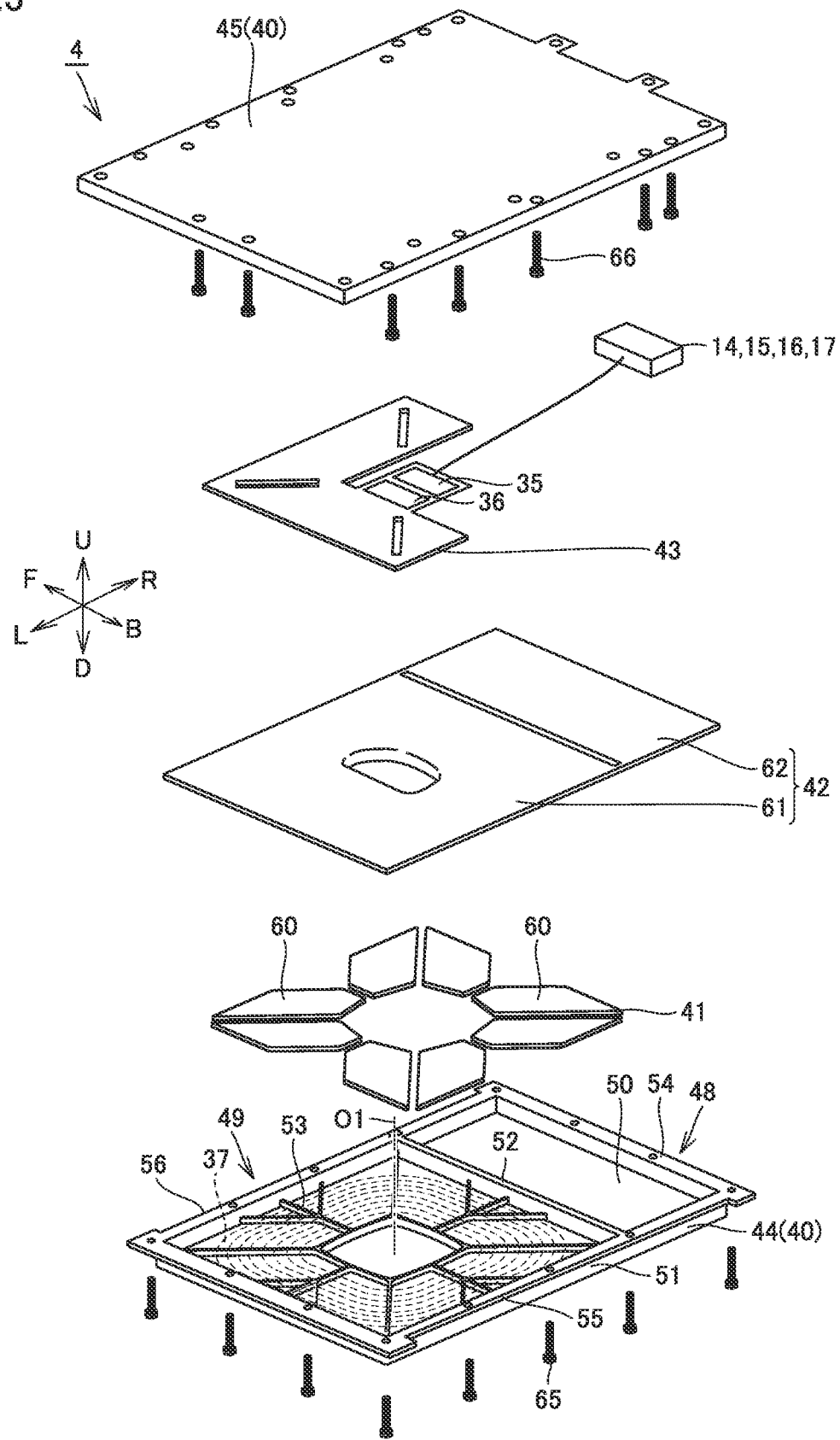
FIG. 3 is an exploded perspective view schematically showing coil unit 4.

FIG. 3 is an exploded perspective view schematically showing coil unit 4. Coil unit 4 includes a case 40, a ferrite plate 41, a shield plate 42, and a substrate 43.

Case 40 includes an under cover 44 and an upper cover 45. Under cover 44 and upper cover 45 are formed from resin or the like.

Under cover 44 includes a bottom plate 50, a peripheral wall 51, a partition wall 52, a support member 53, and a flange 54. Bottom plate 50 is formed in the shape of a flat piece of material. Peripheral wall 51 is formed to extend upward from the outer peripheral edge of bottom plate 50. Partition wall 52 is formed to extend upward from the upper surface of bottom plate 50. Partition wall 52 divides the upper surface of bottom plate 50 into a region 48 and a region 49. Region 49 is larger in area than region 48.

Support member 53 is formed in region 49 of bottom plate 50. Support member 53 is formed to protrude upward from the upper surface of bottom plate 50 for supporting ferrite plate 41 as detailed later herein.

Flange 54 is formed to protrude laterally from the upper end of peripheral wall 51. Flange 54 is formed in an annular shape along the upper end of peripheral wall 51. The outer peripheral edge of flange 54 is formed in a rectangular shape, and flange 54 includes a pair of longer sides. One of the longer sides of flange 54 has a notch 55 formed therein, and the other longer side of flange 54 has a notch 56 formed therein.

Power-receiving coil 37 is embedded in bottom plate 50. Specifically, power-receiving coil 37 is embedded in a portion of bottom plate 50, and region 49 is located in this portion.

Power-receiving coil 37 is formed to surround winding axis O1 extending in the up-and-down direction. The configuration of power-receiving coil 37 is described later herein.

Ferrite plate 41 is disposed on the upper side of under cover 44. Ferrite plate 41 includes a plurality of partial ferrite plates 60. Each partial ferrite plate 60 is fit in support member 53 and supported by support member 53.

Shield plate 42 is disposed on the upper surface of ferrite plate 41. Shield plate 42 is formed from a metal material such as aluminum, for example. Shield plate 42 includes a plate portion 61 and a plate portion 62. Plate portion 61 is disposed on the upper surface of ferrite plate 41, and plate portion 62 is disposed above region 48 of the upper surface of bottom plate 50.

Substrate 43 is disposed on the upper surface of plate portion 61. Capacitor 35 and capacitor 36 are disposed in substrate 43. Capacitors 35 and 36 are each formed of a plurality of ceramic capacitors.

Smoothing capacitor 14, variation absorber 15, rectifier 16, and filter 17 are disposed on the upper side of plate portion 62. During power reception, shield plate 42 prevents an electromagnetic field generated around power-receiving coil 37 from reaching capacitors 35, 36, smoothing capacitor 14, variation absorber 15, rectifier 16, and filter 17, for example.

Upper cover 45 is formed from resin or the like. Upper cover 45 and under cover 44 are fastened to each other by a plurality of bolts 65. Upper cover 45 is fastened to the bottom surface of power storage device 5 by a plurality of bolts 66. Thus, coil unit 4 is secured to the bottom surface of power storage device 5 with bolts 66. Bolts 65, 66 are formed from a metal material such as iron alloy.

Figure 4:
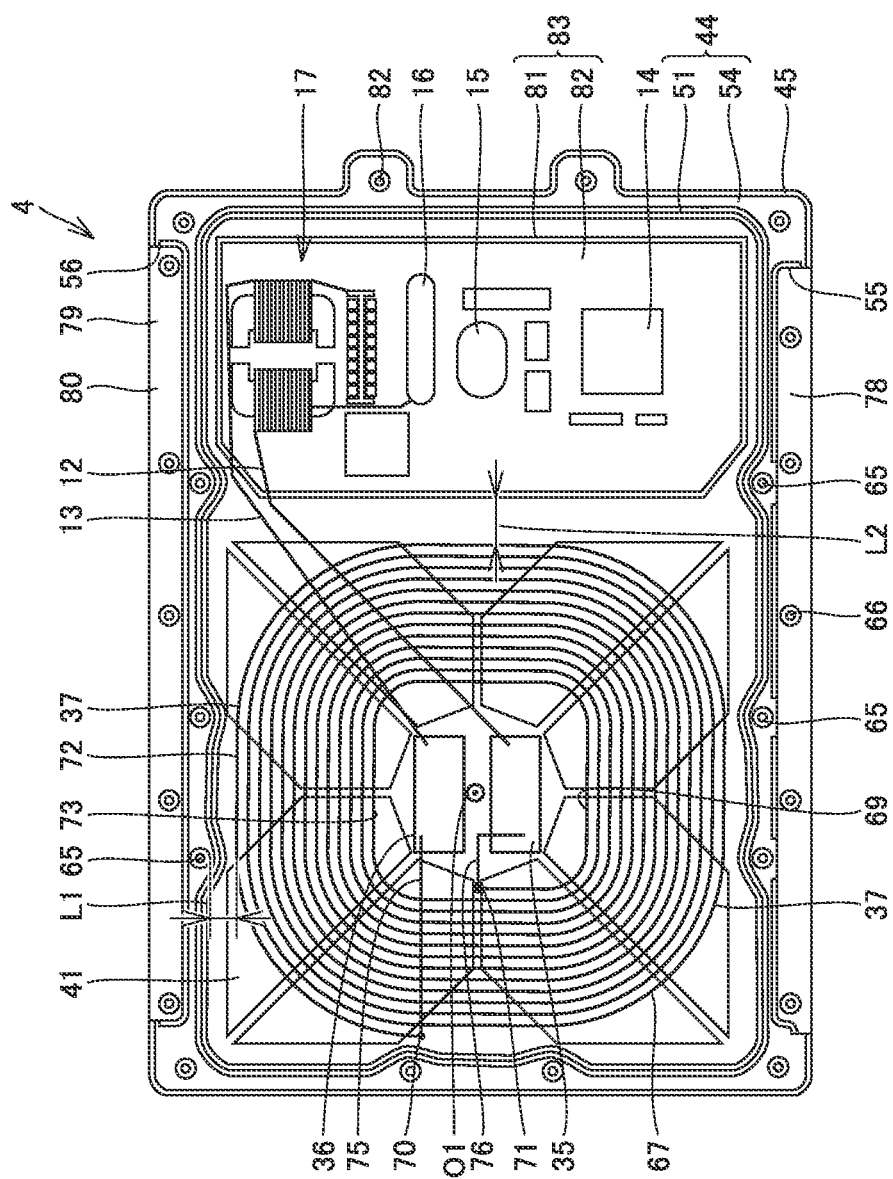
FIG. 4 is a cross-sectional plan view of coil unit 4.

FIG. 4 is a cross-sectional plan view showing coil unit 4. FIG. 4 shows a cross section through peripheral wall 51 of under cover 44, as seen from below. Shield plate 42 is not shown in FIG. 4.

Upper cover 45 includes a top plate 80 and a metal case 83. Top plate 80 is formed from resin. Metal case 83 includes a metal plate 82 and an annular wall 81.

Metal plate 82 is disposed on the lower surface of top plate 80. Annular wall 81 is formed to protrude downward from the outer peripheral edge of metal plate 82, and extend annularly along the outer peripheral edge of metal plate 82. Metal case 83 is formed to have an opening facing downward. On the lower surface of metal plate 82, smoothing capacitor 14, variation absorber 15, rectifier 16, and filter 17 are disposed. Annular wall 81 is formed to surround respective peripheries of the aforementioned devices such as smoothing capacitor 14. Annular wall 81 and metal plate 82 are formed from aluminum or the like.

In the opening of metal case 83, plate portion 62 of shield plate 42 is disposed to form a space in which the aforementioned devices such as smoothing capacitor 14 are accommodated.

Under cover 44 is disposed to cover annular wall 81, ferrite plate 41, and power-receiving coil 37.

A plurality of bolts 65 secure under cover 44 to top plate 80 of upper cover 45. Specifically, each bolt 65 secures flange 54 of under cover 44 to top plate 80 of upper cover 45.

Flange 54 of under cover 44 has a notch 55 and a notch 56 formed therein. Exposed portions 78, 79 that are each a part of top plate 80 are exposed from flange 54 of under cover 44. In exposed portions 78, 79 of top plate 80, a plurality of bolts 66 are disposed, and upper cover 45 is fastened to power storage device 5 with these bolts 66.

Power-receiving coil 37 is formed of a coil wire 67 wound around winding axis O1. A hollow portion 69 is formed in a central portion of power-receiving coil 37. Winding axis O1 passes through hollow portion 69.

Power-receiving coil 37 includes an outermost end 70 and an innermost end 71. From innermost end 71 toward outermost end 70, the distance from winding axis O1 to power receiving coil 37 increases. Power receiving coil 37 includes an outer peripheral portion 72 located in an outer peripheral edge of power receiving coil 37, and an inner peripheral portion 73 located along an inner peripheral edge of power receiving coil 37.

Outer peripheral portion 72 is a single winding of the coil wire extending from outermost end 70, and inner peripheral portion 73 is a single winding of the coil wire extending from the innermost end 71.

A wire 75 is connected to outermost end 70. Wire 75 is connected to capacitor 36. A wire 76 is connected to innermost end 71. Wire 76 is connected to capacitor 35. Power line 13 is connected to capacitor 36, and power line 12 is connected to capacitor 35.

Filter 17, rectifier 16, and variation absorber 15 are connected in the manner as shown in FIG. 2. Referring to FIG. 2, when electric power is transmitted from power-transmitting coil unit 3 to power-receiving coil unit 4, AC current flows through power-transmitting coil 8. The frequency of AC current flowing through power-transmitting coil 8 is, for example, on the order of several tens of kHz to one hundred and several tens of kHz, and is on the order of 85 kHz, for example.

As AC current flows through power-transmitting coil 8, an electromagnetic field is formed around power-transmitting coil 8. Power-receiving coil 37 receives electric power through the electromagnetic field.

For example, power-transmitting coil 8 transmits electric power so that power-receiving coil 37 receives several kW of electric power. For example, in order for power-receiving coil 37 to receive electric power on the order of 3 kW, several kV of voltage is applied to power-receiving coil 37.

Between outermost end 70 and innermost end 71, a voltage difference on the order of 100 V at the maximum is generated, so that the voltage on innermost end 71 is higher than the voltage on outermost end 70. This voltage difference is a voltage difference generated in a steady state during power reception, rather than a voltage difference in a transition state or a state in which noise is overlapped.

Referring to FIG. 4, since the voltage on outermost end 70 is lower than the voltage on innermost end 71, insulation distance L1 between bolts 65 and outer peripheral portion 72 can be made shorter. If the voltage on outermost end 70 is higher than the voltage on innermost end 71, the insulation distance between bolts 65 and outermost end 70 has to be made longer than insulation distance L1.

Likewise, the insulation distance between bolts 66 and outer peripheral portion 72 can also be made shorter, upper cover 45 can be reduced in size, and the physical size of coil unit 4 can accordingly be reduced.

Referring to FIG. 4, since the voltage on outer peripheral portion 72 is lower, insulation distance L2 between outer peripheral portion 72 and annular wall 81 can also be made shorter. Since the distance between metal case 83 and outer peripheral portion 72 can be made shorter, the physical size of coil unit 4 can be reduced.

As seen from the above, in coil unit 4 according to the present embodiment, the distance between the metal member disposed in coil unit 4 and power-receiving coil 37 can be made shorter, and accordingly the physical size of coil unit 4 can be reduced.

Next, a description is given of the reason estimated by the inventor why the voltage on outermost end 70 is lower than the voltage on innermost end 71 in the circuit configuration of FIG. 2.

Outermost end 70 is connected to node N1 through power line 13. Node N1 is located between capacitor 20 and capacitor 21 of variation absorber 15. Capacitor 20 and capacitor 21 reduce a voltage variation of power storage device 5. Similarly, capacitor 20 and capacitor 21 also reduce a voltage variation of node N1.

Accordingly, the voltage amplitude of outermost end 70 connected to node N1 is smaller than the voltage amplitude of innermost end 71. As a result, the voltage on outermost end 70 is lower than the voltage on innermost end 71 in a steady state during power reception.

Figure 5:
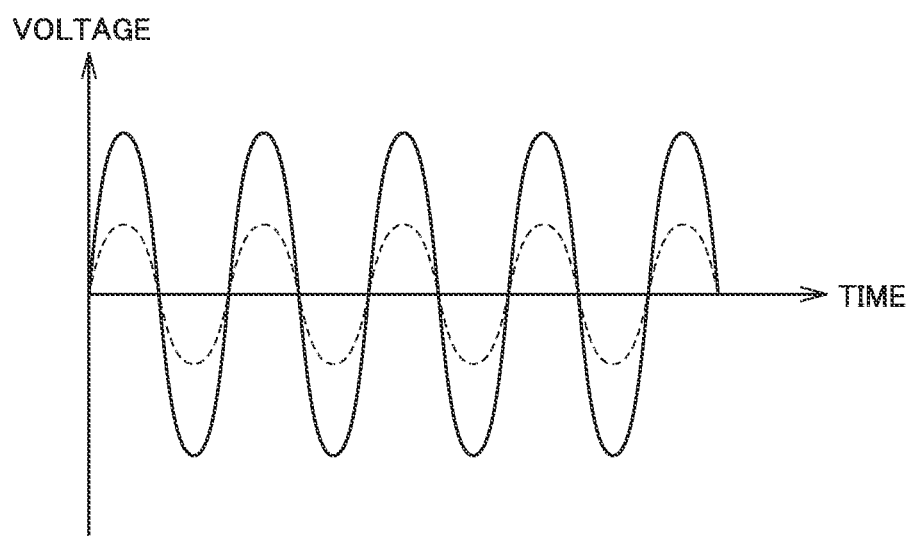
FIG. 5 is a graph showing a voltage variation on each of an outermost end 70 and an innermost end 71.

FIG. 5 is a graph schematically showing a voltage variation on each of outermost end 70 and innermost end 71. The horizontal axis represents time, and the vertical axis represents voltage. The relation indicated by the broken line represents the voltage on outermost end 70, and the relation indicated by the solid line represents the voltage on innermost end 71. As shown by the graph, the voltage on outermost end 70 is lower than the voltage on innermost end 71. The maximum voltage difference is approximately 100 V.

As a result, it is seen that the voltage on outer peripheral portion 72 is lower than the voltage on inner peripheral portion 73, and accordingly coil unit 4 can be reduced in size.

In the example described in connection with the foregoing embodiment, outermost end 70 of power-receiving coil 37 is connected to node N1 and node N2. As a method for making a voltage variation on outermost end 70 smaller than a voltage variation on innermost end 71, any of a variety of methods may be used.

In the example described in connection with the foregoing embodiment, the embodiment is applied to the power-receiving coil unit. The embodiment, however, is also applicable to the power-transmitting coil unit.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A coil unit comprising:
   a coil formed of a coil wire wound around a winding axis, a hollow portion being formed in a position in which the winding axis passes;
   an accommodation case accommodating the coil;
   a metal member;
   a first power line connected to a power storage device;
   a second power line connected to the power storage device;
   a first capacitor and a second capacitor connected in series to each other between the first power line and the second power line; and
   a rectifier connected to the first power line and the second power line, the rectifier including:
      a first element and a second element connected in series to each other between the first power line and the second power line; and
      a third element and a fourth element connected in series to each other between the first power line and the second power line;
   the coil including:
      an outer peripheral portion located in an outer peripheral edge of the coil, the outer peripheral portion is connected between the first capacitor and the second capacitor; and
      an inner peripheral portion located along an inner peripheral edge of the coil, the inner peripheral portion is connected between the first element and the second element,
   a voltage on the inner peripheral portion being higher than a voltage on the outer peripheral portion.

2. The coil unit according to claim 1, wherein
the metal member is a fastening member configured to fasten the accommodation case to a mount surface, and
the fastening member is disposed outside the outer peripheral portion of the coil.

3. The coil unit according to claim 1, wherein
the accommodation case includes a first cover member and a second cover member, and
the metal member is a cover fastening member configured to fasten the first cover member and the second cover member to each other.

4. The coil unit according to claim 1, further comprising a device connected to the coil, wherein
the metal member is a metal case accommodating the device and accommodated in the accommodation case.

* * * * *

UNITED STATES PATENT AND TRADEMARK OFFICE
CERTIFICATE OF CORRECTION

PATENT NO. : 10,833,537 B2  
APPLICATION NO. : 16/290205  
DATED : November 10, 2020  
INVENTOR(S) : Taiga Doi Page 1 of 1

It is certified that error appears in the above-identified patent and that said Letters Patent is hereby corrected as shown below:

On the Title Page

Item (71), applicant, city, delete "Toyota" and insert --Toyota-shi Aichi-ken--, therefor.

Item (72), inventor 1, city, delete "Okazaki" and insert --Okazaki-shi Aichi-ken--, therefor.

Item (73), assignee, city, delete "Toyota" and insert --Toyota-shi Aichi-ken--, therefor.

Signed and Sealed this  
Sixteenth Day of March, 2021

Drew Hirshfeld  
*Performing the Functions and Duties of the*  
*Under Secretary of Commerce for Intellectual Property and*  
*Director of the United States Patent and Trademark Office*